United States Patent

Carlson

[11] 4,375,602
[45] Mar. 1, 1983

[54] ONE LOBED MOTOR

[75] Inventor: John H. Carlson, Danvers, Mass.

[73] Assignee: USM Corporation, Farmington, Conn.

[21] Appl. No.: 185,345

[22] Filed: Sep. 8, 1980

[51] Int. Cl.³ .............................................. H02K 7/06
[52] U.S. Cl. ...................................... 310/83; 310/82; 310/49 R; 74/640
[58] Field of Search .................. 310/49 R, 89, 80, 81, 310/82, 83; 74/640

[56] References Cited

U.S. PATENT DOCUMENTS

| | | | |
|---|---|---|---|
| 2,795,713 | 6/1957 | Woll | 310/89 UX |
| 3,311,766 | 3/1967 | Scott | 310/82 |
| 3,331,974 | 7/1967 | Proctor | 310/49 R |
| 3,456,139 | 7/1969 | Newell | 310/49 R |
| 3,496,395 | 2/1970 | Newell | 310/49 R |
| 3,894,255 | 7/1975 | Newton | 310/49 R |
| 4,117,356 | 9/1978 | Mansfield | 310/49 R |

Primary Examiner—R. Skudy
Attorney, Agent, or Firm—Donald N. Halgren

[57] ABSTRACT

A digital stepping motor having a rigid tubular rotor arranged within a stator, in a housing, the stator having an arrangement of spline teeth adjacent one end thereof on a portion of the housing. The rotor has an array of spline teeth disposed at one end thereof, and a deflectable diaphragm at the other end thereof. The deflectable diaphragm is fixedly attached to an output shaft. The tubular rotor has an axis of rotation which is slightly skewed with respect to the axis of rotation of the output shaft during energization of the motor when the rotor is attracted to the stator. The stator comprises a plurality of equi-angularly spaced coils, the sequential energization of which causes sequential circumferential engagement of corresponding external and internal spline teeth between the rotor and the spline teeth on the end cap, creating an orbiting motion within the rotor, and a subsequent rotation of the output shaft.

13 Claims, 2 Drawing Figures

ONE LOBED MOTOR

BACKGROUND OF THE INVENTION (1) Field of the Invention

The present invention relates generally to electrically actuated stepping motors, and more particularly to a stepping motor having a rotor angled with respect to its output shaft.

(2) Prior Art

In my copending U.S. Patent Application Ser. No. 83,339, filed Oct. 10, 1979, there is shown a wave generator having two or three lobes as part of a motion transmitting mechanism. The wave generator acts upon a flexspline gear which in one particular embodiment, transmits rotary power to an output shaft. Motion transmission in motors is also embodied in U.S. Pat. No. 3,331,974, to Proctor, wherein a deflectable rotor with spline teeth near one end thereof engages a circular spline in two diametrically opposed areas to effectuate rotary motion therebetween. The rotor, however, uses a magnetic shim stock wound therewithin, and a radial deflection stress is induced in the rotor, which stress limits the number of steps per output shaft revolution.

Subsequent stepping motor development is shown in U.S. Pat. No. 3,456,139 to Newell; U.S. Pat. No. 3,492,151 to Foskett; U.S. Pat. No. 3,644,764 to Newell and U.S. Pat. No. 3,894,255 to Newton, which each describe stepping motors utilizing some form of a single lobed rotor. They also each use a universal joint which secures a nutating gear or drum-like rotor to an output shaft. This type of junction is however, subject to fretting and may break down prematurely. The U.S. Pat. No. 3,456,139 to Newell shows a double wobble drum arranged about a universal ball joint. The U.S. Pat. No. 3,492,515 to Foskett discloses a face gear biasedly arranged on a spheroidal member by a spring. The U.S. Pat. No. 3,644,764 to Newell also shows a face gear with two sets of associated gear teeth arranged on a universal joint on an output shaft. The U.S. Pat. No. 3,894,255 to Newton shows a single lobed motor with a drum-like rotor adapted with a universal joint near one end, and an extended shaft adapted to a gear with a tip that gyrates about a similar stationary tip in an end bell. This arrangement is complicated in its support and its drive functions in accomplishing its objective.

It is an object of the present invention to provide a single lobed stepping motor of less complicated construction than is shown in the prior art.

It is a further object of the present invention to provide stepping motors wherein internal and external gears could be easily assembled, with teeth of differing numbers, to produce a variety of ratios therewith.

It is a still further object of the present invention to provide a stepping motor wherein the rotor is radially attached to the stator.

It is yet a further object of the present invention to provide a stepping motor having a rotor attached to an output shaft by a deflectable diaphragm capable of outperforming the prior art stepping motors in efficiency, range of operation and economy.

BRIEF DESCRIPTION OF THE INVENTION

The present invention comprises a stepping motor having a stator and a rigid rotor or cylinder with an external gear arranged about the distal end thereof which end has external teeth that are caused to engage teeth arranged on the housing on an internal gear during energization of the motor. The other end of the rotor or cylinder has a support member or diaphragm attached thereacross which is secured to an output shaft. The axis of the rigid rotor or cylinder is skewed with respect to the axis of the output shaft during energization of the motor, which rotor or cylinder maintains its cylindrical shape during operation of the motor. The distal end of the rotor or cylinder is caused to orbit within the stator during energization thereof, the axis of the rotor or cylinder describing a cone of precession as it moves therewithin, effectuating rotation of the output shaft. The internal and external gearing may have differing numbers of spline teeth therein, which can be assembled to produce a variety of different ratios with the motor. The rotor or cylinder itself is of rigid construction to eliminate radial deflection stresses therewith, and to permit a very low number of steps per output revolution than is otherwise available with harmonic drive type stepping motors.

BRIEF DESCRIPTION OF THE DRAWINGS

The objects and advantages of the invention will become more apparent when viewed in conjunction with the following drawings, in which.

DESCRIPTION OF THE PREFERRED EMBODIMENTS

Figure 1:
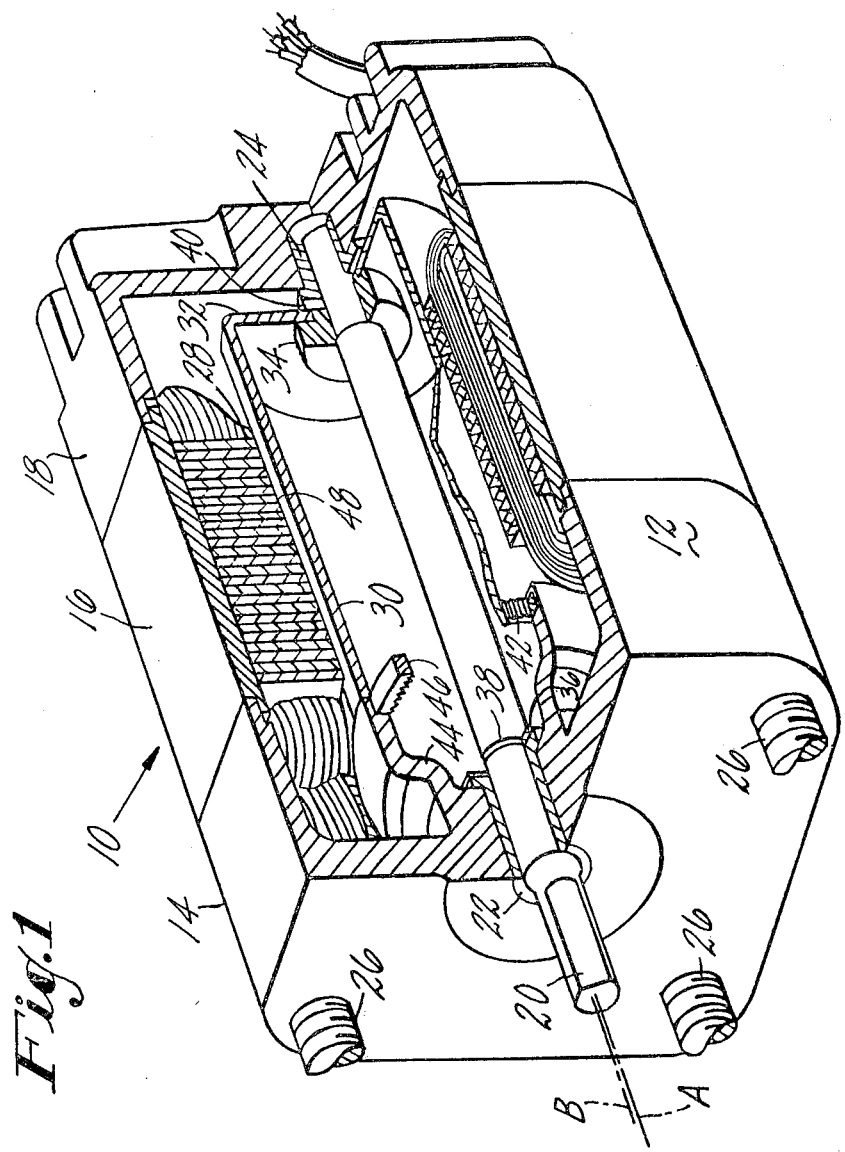
FIG. 1 is a perspective view of a stepping motor with an orbital rotor or cylinder constructed according to the principles of the present invention.

Referring now to the drawings in detail, there is shown in FIG. 1 a stepping motor 10, including a housing 12 comprising a first end cap 14, an intermediate housing portion 16 and a second end cap 18. An output shaft 20 is journalled in axially spaced first and second bushing bearings 22 and 24 in the first and second end caps 14 and 18, respectively. The end caps 14 and 18 may be secured in a clamping relationship by a plurality of bolts 26, axially of the intermediate housing portion 16, which intermediate housing 16 encloses a laminated stator 28. A rigid generally cylindrically shaped magnetically permeable rotor or cylinder 30 is disposed within the stator 28 and is secured to the output shaft 20 by a flexible support member which may include an arrangement of spokes but which is preferably a diagrapm 32. A collar 34 is integral with the shaft 20 and is attached to the radially inner portion of the flexible support member or diaphragm 32, to facilitate the relationship therebetween. The support member 32 may alternatively be rigid, and the collar 34 be flexible to accomplish the same effect upon the cylinder 30 as hereinafter described. A retaining ring 36, seated in a groove 38 on the shaft 20, abuts the first bearing 22 to prevent any relative endwise movement of the shaft 20 in one direction and a flange 40 in the second bearing 24 prevents relative axial movement of the shaft 20 in the opposite direction.

The rigid cylinder 30 has a first gear or external spline gear 42 circumferentially arranged generally near the end thereof, opposite the support member or diaphragm 32. The first end cap may include a ring-like annular flange 44 arranged coaxially with the output shaft 20, which output shaft 20 has an axis of rotation 'A', as shown in FIG. 1. A second circular spline or internal spline gear 46 may be arranged near the distal periphery of the annular flange 44 on the inner edge thereof.

The stator 28 has a bore 48 extending therethrough, in which the rotor 30 operates. The bore 48 may have a slightly larger diameter radially adjacent the spline gears 42 and 46, and which bore 48 tapers slightly radially inwardly towards the diaphragm 32. The rotor 30 may be reciprocably dimensioned, that is, the diameter thereof at its distal end near the first gear 42 may be smaller than the diameter of the rotor 30 at the diaphragm 32. The circular spline gear 46 may have its teeth cut at an angle corresponding to the taper of the bore 48 in the stator 28. That is, in one embodiment, the internal spline gear 46 may be of smaller diameter adjacent the distal periphery of the annular flange 44 than that portion of the spline gear 46 adjacent the proximal end of the annular flange 44 to compensate for skewness of the rotor 30 during motor operation.

The stator 28 may be comprised of a plurality of laminations arranged side-by-side and coated in a conventional manner to provide insulation therefor. These may be stamped out in identical configurations and formed with equi-spaced internally disposed cores having arcuate pole faces, stacked and then machined to provide the slight conical bore 48, mentioned above. The stator 28 has a field winding which is arranged to be sequentially energized by a driver, not shown, to permit circumferentially adjacent poles to attract the rotor or cylinder 30 seriatum, during operation thereof to effectuate movement therewith. That is, when one or more pairs of adjacent poles of the stator 28 is energized, the cylindrically rigid rotor or cylinder 30, has a longitudinal axis 'B', which during energization, is caused to be shifted or skewed, to effectuate engagement of corresponding teeth on the internal and external spline gears 46 and 42, respectively. The diaphragm 32, securing the rotor 30 to the output shaft 20, deflects accordingly to accommodate the shift in the axis B of the rotor or cylinder 30, from coincidence with the axis A of the output shaft 20, to a slight skewness therewith during energization of the motor 10. The diaphragm may be made integral with the rotor or cylinder 30 as shown in FIG. 1, or it may be manufactured independently thereof, and welded at radially adjacent circumferential flanges, not shown.

By progressively energizing in a proper manner, the advancing circumferentially adjacent pairs of poles in the stator 28, and by de-energizing the trailing pairs of poles, the rotor or cylinder 30 is caused to orbit within the bore 48, the axis of rotation B of the rotor or cylinder 30 defining a cone of precession.

There are fewer teeth on the external spline gear 42 than there are on the internal stationary spline gear 46, so the rotative position of the output shaft 20 shifts by an amount equal to the difference in the number of teeth between the internal spline gear 46 and the external spline gear 42 for each orbit or rotational event of the rotor or cylinder 30. Utilizing this capability of the present invention, wherein successive rotors or cylinders may have different numbers of external spline teeth thereon, several ratios of rotor or cylinder orbits per output shaft revolution are available. The internal and external spline gears 46 and 42 may be manufactured as part of their respective annular flange and/or rotor members 44 and 30 or they may be manufactured independently and mated therewith by welding or the like.

It is to be noted in an alternative embodiment that the spline gear arranged on the distal end of the rotor or cylinder 30 could be fitted to an internal configuration and adapted as an internal spline gear and that the stationary spline gear 48 could be arranged as an external ring gear, the rotor or cylinder 30 then orbiting with its distal periphery radially outwardly of the ring-like annular flange 44.

Figure 2:
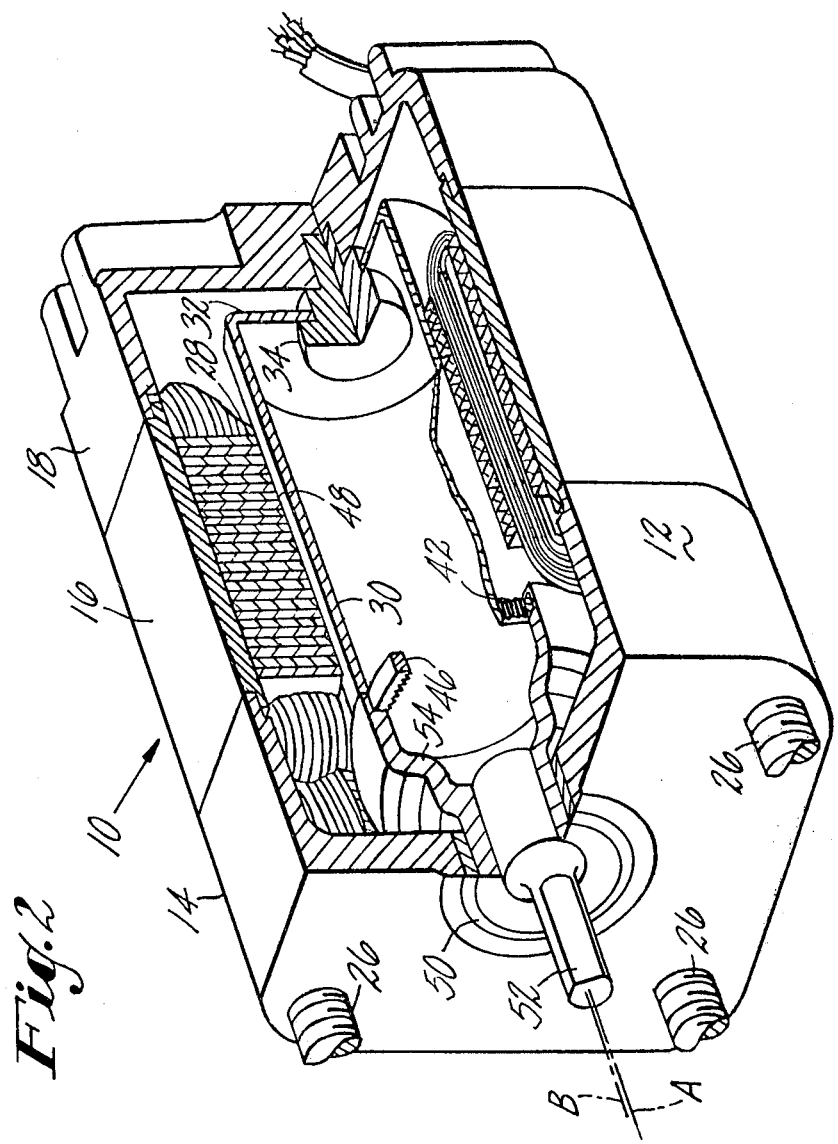
FIG. 2 is an alternative embodiment of the invention shown in FIG. 1.

A further embodiment is to be noted, as shown in FIG. 2, wherein the rotor herein preferably identified in this embodiment as a cylinder 30 may have the radially inner portion of the support member or diaphragm 32 fixedly attached to one end cap 18 by a collar 34 which may be flexible or rigid. The first gear or circular spline 46 may comprise the output member by being journalled to the other end cap 14 in a bearing 50 and attached to an output shaft 52 through an annular flange-like support 54 arranged therebetween. The distal end of the rotor cylinder 30 would still be caused to orbit in-place about the output shaft during motor energization causing progressive circumferential engagement of the teeth of the first and second gears 42 and 46, to effectuate rotational motion in the output shaft, however, the support member or diaphragm itself being fixedly attached to one end cap 18 would not have any complete rotational component about the axis A of the motor.

Thus, there has been shown a single lobed stepping motor which is capable of output in a range wider than that of the art, utilizing deflection mechanics wherein the motor components are simpler, more economical and longer lasting.

Having thus described my invention, what I claim as new and desire to secure by Letters Patent of the United States is:

1. A motor comprising:
   a motor housing including a first and a second end cap;
   a stator having energizable poles therearound, and said stator also having a generally axially arranged bore, said stator being axially disposed within said housing;
   an output member arranged in said motor;
   a rigid cylinder arranged with said stator, said cylinder having a flexible support arranged at one end thereof, and a first gear arranged at the other end of said cylinder;
   a second gear supported adjacent said first gear, wherein selective energization of said poles effectuates orbital motion of said cylinder and rotational motion in said output member.

2. A motor as recited in claim 1, wherein said second gear is disposed at one of said end caps as part of an annular flange thereat.

3. A motor as recited in claim 2, wherein said output member is a shaft journalled in at least one of said end caps.

4. A motor as recited in claim 3, wherein said output shaft is connected to said flexible support.

5. A motor as recited in claim 3, wherein said output shaft is connected to said second gear.

6. A motor as recited in claim 3, wherein said first gear on said cylinder is on the outer periphery thereof, and said second gear on said annular flange is on the inner periphery thereof.

7. A motor as recited in claim 3, wherein said rigid cylinder has an axis of rotation which is skewed with respect to the axis of rotation of said output shaft during energization of said poles in said stator.

8. A motor as recited in claim 7, wherein said axis of rotation of said rigid cylinder describes a cone of precession as the rigid cylinder orbits about said output shaft.

9. A motor as recited in claim 7, wherein said stator bore has its peripheral surface angled with respect to said axis of rotation of said output shaft.

10. A motor as recited in claim 7, wherein the gear teeth on said annular flange are disposed at a slight angle with respect to the axis of rotation of said output shaft.

11. A motor as recited in claim 7, wherein said rigid cylinder retains its cylindrical shape as it orbits about said output shaft.

12. A motor as recited in claim 11, wherein advancing energization of selective pairs of poles and advancing de-energization of selective pairs of poles, both sets of poles contiguous to the point of contact of said first and second gears, effectuates said cylinder orbiting and output shaft rotation.

13. A motor as recited in claim 4, wherein said flexible support at one end of said cylinder comprises a diaphragm disposed thereacross.

* * * * *